US012090398B2

(12) United States Patent
Varela et al.

(10) Patent No.: US 12,090,398 B2
(45) Date of Patent: Sep. 17, 2024

(54) SYSTEMS AND METHODS TO ENTERTAIN AN OCCUPANT OF A VEHICLE

(71) Applicant: Ford Global Technologies, LLC, Dearborn, MI (US)

(72) Inventors: Diana Varela, Mexico City (MX); Angelica Godinez, Cuautitlán Izcalli (MX); Jose Mauricio Sanchez, Cuautitlan Izcalli (MX); Victor Lopez, Cuautitlan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 17/658,409

(22) Filed: Apr. 7, 2022

(65) Prior Publication Data

US 2023/0321533 A1   Oct. 12, 2023

(51) Int. Cl.
*A63F 13/42*   (2014.01)
*A63F 13/814*  (2014.01)
(Continued)

(52) U.S. Cl.
CPC ............ *A63F 13/42* (2014.09); *A63F 13/814* (2014.09); *G06F 3/04817* (2013.01);
(Continued)

(58) Field of Classification Search
CPC .. B60K 35/22; B60K 35/28; B60K 2360/164; B60K 2360/1438; B60K 2360/119
See application file for complete search history.

(56) References Cited

U.S. PATENT DOCUMENTS 4,564,905 A * 1/1986 Masuda ................. G01F 9/008
                                                    701/1
4,845,630 A * 7/1989 Stephens ............... G01F 9/023
                                                    701/123
(Continued)

FOREIGN PATENT DOCUMENTS

WO    2020011203 A1    1/2020

OTHER PUBLICATIONS

Warren Brodsky, A Performance Analysis of In-Car Music Engagement as an Indication of Driver Distraction and Risk, ScienceDirect, Transportation Research Part F 55, Feb. 28, 2018, 210-218.
(Continued)

*Primary Examiner* — Chase E Leichliter
(74) *Attorney, Agent, or Firm* — Frank Lollo; Eversheds Sutherland (US) LLP (57) ABSTRACT

The disclosure is generally directed to in-vehicle entertainment systems and methods. An example method executed by processor of a vehicle may include displaying an iconic representation containing a first icon representing a musical instrument and a second icon representing a vehicle component. The processor may detect an assigning of the musical instrument to the vehicle component. The assigning may be carried out, for example, by a driver of the vehicle executing a drag-and-operation to overlap the first icon with second icon. The processor may then detect a physical contact made upon the vehicle component and generate, based on detecting the physical contact, a musical sound corresponding to the musical instrument.

19 Claims, 5 Drawing Sheets

(51) Int. Cl.
  *G06F 3/04817* (2022.01)
  *G06F 3/0486* (2013.01)
(52) U.S. Cl.
  CPC ........ *G06F 3/0486* (2013.01); *A63F 2300/10* (2013.01); *A63F 2300/308* (2013.01); *A63F 2300/8047* (2013.01)

(56) References Cited

U.S. PATENT DOCUMENTS

| | | | | |
|---|---|---|---|---|
| 5,062,341 | A * | 11/1991 | Reiling | G10H 1/42 84/738 |
| 5,557,683 | A * | 9/1996 | Eubanks | H04R 5/02 84/625 |
| 6,289,332 | B2 * | 9/2001 | Menig | B60K 35/00 340/439 |
| 7,603,228 | B2 * | 10/2009 | Coughlin | B60W 40/09 345/157 |
| 7,663,047 | B2 * | 2/2010 | Hanuschak | G10H 1/34 84/602 |
| 8,009,026 | B2 * | 8/2011 | Giuli | H04L 67/131 340/459 |
| 8,160,813 | B1 * | 4/2012 | McDermed | G09B 1/06 701/465 |
| 8,939,839 | B2 * | 1/2015 | Cash | A63F 13/428 463/40 |
| 9,263,775 | B1 * | 2/2016 | Lowchareonkul | H01M 10/488 |
| 10,573,102 | B2 * | 2/2020 | Mito | G07C 5/0825 |
| 2005/0220044 | A1 * | 10/2005 | Choi | A63F 13/217 370/310 |
| 2006/0052167 | A1 * | 3/2006 | Boddicker | B60N 3/005 463/37 |
| 2006/0148546 | A1 * | 7/2006 | Inoue | A63F 13/803 463/6 |
| 2007/0088465 | A1 * | 4/2007 | Heffington | G07C 5/085 701/1 |
| 2007/0213884 | A1 * | 9/2007 | Burnham | A63F 13/22 701/1 |
| 2007/0234888 | A1 * | 10/2007 | Rotolo de Moraes | G10H 1/42 84/730 |
| 2007/0276582 | A1 * | 11/2007 | Coughlin | B60W 50/16 701/123 |
| 2007/0293124 | A1 * | 12/2007 | Smith | A63H 30/00 446/454 |
| 2008/0115654 | A1 * | 5/2008 | Hanuschak | G10H 1/34 84/602 |
| 2008/0301556 | A1 * | 12/2008 | Williams | G06T 13/40 715/706 |
| 2009/0081923 | A1 * | 3/2009 | Dooley | A63F 13/803 463/6 |
| 2010/0176914 | A1 * | 7/2010 | Moraes | B60K 35/10 340/3.1 |
| 2010/0214089 | A1 * | 8/2010 | Giuli | H04L 67/12 340/459 |
| 2010/0333146 | A1 * | 12/2010 | Pickney | H04N 21/41422 381/86 |
| 2011/0124389 | A1 * | 5/2011 | Lee | B60K 35/00 463/9 |
| 2012/0038473 | A1 * | 2/2012 | Fecher | H02J 7/005 340/455 |
| 2012/0075107 | A1 * | 3/2012 | Newman | H01M 10/48 340/636.19 |
| 2012/0256751 | A1 * | 10/2012 | Nallabelli | H02J 7/0048 340/636.1 |
| 2013/0083061 | A1 * | 4/2013 | Mishra | A63F 13/803 345/633 |
| 2013/0145360 | A1 * | 6/2013 | Ricci | G06F 17/00 717/174 |
| 2014/0211962 | A1 * | 7/2014 | Davis | B60W 50/14 381/86 |
| 2014/0292524 | A1 * | 10/2014 | Nallabelli | H01M 10/4257 340/636.1 |
| 2015/0294656 | A1 * | 10/2015 | Hanuschak | G10H 1/0556 345/173 |
| 2015/0339031 | A1 * | 11/2015 | Zeinstra | B60K 35/10 715/747 |
| 2016/0089994 | A1 * | 3/2016 | Keller | B60L 53/14 320/153 |
| 2017/0054305 | A1 * | 2/2017 | Kidakarn | H04M 1/00 |
| 2017/0254858 | A1 * | 9/2017 | Weicker | G01R 31/3648 |
| 2018/0012197 | A1 * | 1/2018 | Ricci | G07C 5/0808 |
| 2018/0017399 | A1 * | 1/2018 | Rolnik | G01C 21/3469 |
| 2018/0293047 | A1 * | 10/2018 | Suzuki | G10L 21/00 |
| 2019/0220674 | A1 * | 7/2019 | Khalfan | G06V 20/59 |
| 2019/0260832 | A1 * | 8/2019 | Tokuchi | H04L 41/046 |
| 2019/0385379 | A1 * | 12/2019 | Woo | G01C 21/3626 |
| 2020/0042000 | A1 * | 2/2020 | Jung | G05D 1/0061 |
| 2020/0169107 | A1 * | 5/2020 | Joshi | H01M 10/44 |
| 2020/0384885 | A1 * | 12/2020 | Namiki | B60K 35/00 |
| 2021/0053439 | A1 * | 2/2021 | Kazuno | G06F 3/14 |
| 2021/0069602 | A1 * | 3/2021 | Namiki | A63F 13/95 |
| 2021/0074048 | A1 * | 3/2021 | Namiki | B60L 53/80 |
| 2021/0074049 | A1 * | 3/2021 | Namiki | B60L 58/12 |
| 2021/0276443 | A1 * | 9/2021 | Namiki | B60L 53/62 |
| 2022/0062752 | A1 * | 3/2022 | Zeng | G06F 3/013 |
| 2022/0108675 | A1 * | 4/2022 | Brockwell | G06F 3/165 |
| 2023/0321533 | A1 * | 10/2023 | Varela | A63F 13/803 |

OTHER PUBLICATIONS

Sara Spary, Mazda Transforms Car Into Musical Instrument in Youtube Film, https://www.campaignlive.co.uk/article/mazda-transforms-car-musical-instrument-youtube-film/1326729, Dec. 16, 2014.

* cited by examiner

SYSTEMS AND METHODS TO ENTERTAIN AN OCCUPANT OF A VEHICLE

BACKGROUND

Waiting in a vehicle due to a traffic delay, for example, can be very frustrating to a driver of the vehicle. Some drivers may keep themselves occupied during a traffic delay by listening to audio content delivered through a radio in the vehicle. The audio content can become routine and boring in some cases. Some other drivers may keep themselves occupied during a traffic delay by using a smartphone to perform activities such as surfing the Web, emailing, texting, and exchanging content. In some jurisdictions, the use of a smartphone can be impermissible, and even if permissible, may turn out to be a driving distraction. It is therefore desirable to address various issues related to waiting in a vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, embodiments described in this disclosure are generally directed to in-vehicle entertainment systems and methods. An example method executed by processor of a vehicle may include displaying an iconic representation containing a first icon representing a musical instrument and a second icon representing a vehicle component. The processor may detect an assigning of the musical instrument to the vehicle component. The assigning may be carried out, for example, by a driver of the vehicle executing a drag-and-drop operation to overlap the first icon (musical instrument) with the second icon (vehicle component). The processor may then detect a physical contact made upon the vehicle component and, based on detecting the physical contact, generate a musical sound corresponding to the musical instrument.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, it must be understood that the word "entertainment" as used herein encompasses various forms of activities offered by an in-vehicle entertainment system for purpose of keeping an occupant of a vehicle, particularly a driver of the vehicle, entertained. In one example implementation, the in-vehicle entertainment system may provide entertainment (music, games, karaoke, etc.) only when the vehicle is stationary (as when stopped at a traffic light or a traffic jam). In another example implementation, the in-vehicle entertainment may provide such entertainment not only when the vehicle is stopped but also when the vehicle is in motion. Options offered by the in-vehicle entertainment system to a driver of a vehicle when the vehicle is in motion may be restricted in some ways to decrease driver distractions. In yet another example implementation where the vehicle is an autonomous vehicle, the in-vehicle entertainment system may provide entertainment in an unrestricted manner not only when the vehicle is stopped but also when the vehicle is in motion.

The word "vehicle" as used in this disclosure can pertain to any one of various types of vehicles such as cars, vans, sports utility vehicles, trucks, electric vehicles, gasoline vehicles, hybrid vehicles, driver-operated vehicles, and autonomous vehicles. More generally, the systems and methods disclosed herein are applicable to various types of vehicles that are defined by the Society of Automotive Engineers (SAE) as incorporating six levels of driving automation ranging from Level 0 (fully manual) to Level 5 (fully autonomous). As such, in various instances, a description herein with reference to a driver of a vehicle should be understood as being equally applicable to a passenger in the vehicle (both in the case of a driver-operated vehicle and in the case of an autonomous vehicle where a "driver" may not be present).

It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

Figure 1:
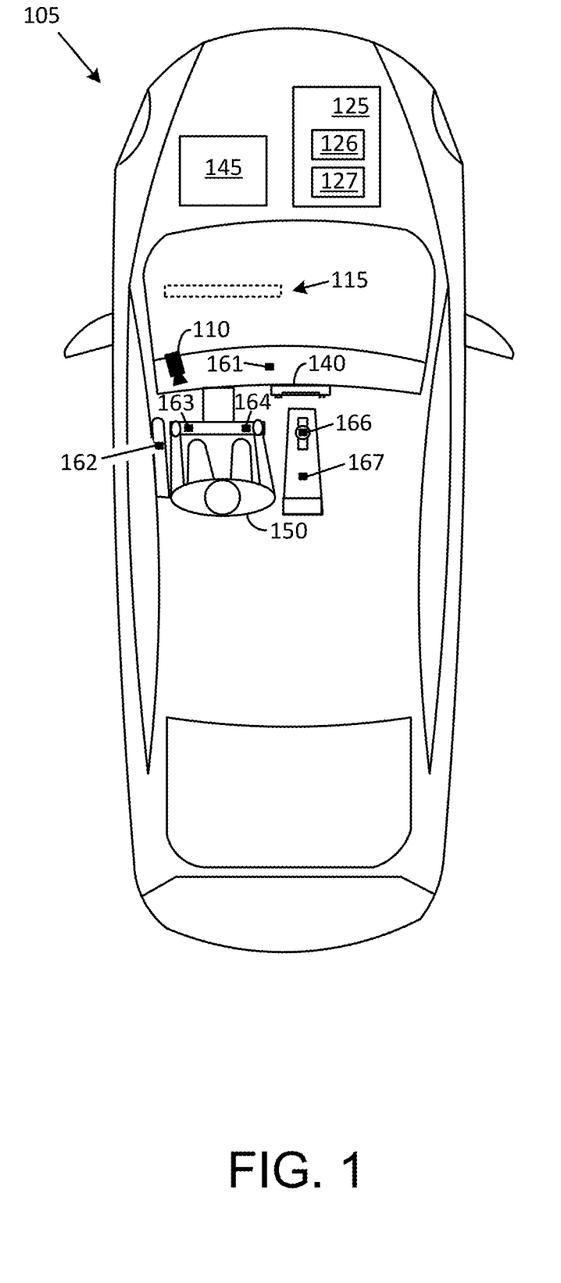
FIG. 1 shows an example vehicle that includes an in-vehicle entertainment system in accordance with an embodiment of the disclosure.

FIG. 1 shows a vehicle 105 that includes an in-vehicle entertainment system 125 in accordance with an embodiment of the disclosure. The in-vehicle entertainment system 125 can include a processor 126 that is configured to execute computer-executable instructions stored in a memory 127 for performing various operations in accordance with the disclosure. The vehicle 105 may further include components such as, for example, a vehicle computer 145, an infotainment system 140, a heads-up display 115, and various sensors that may be integrated into various vehicle components present in a cabin area of the vehicle 105. In at least some implementations, the vehicle 105 can also include one or more cameras such as, for example, a camera 110 that is provided in the cabin area of the vehicle 105.

The vehicle computer 145 may be configured for executing various operations related to the vehicle 105, such as, for example, controlling engine operations (fuel injection, speed control, emissions control, braking, etc.), managing climate controls (air conditioning, heating etc.), activating airbags, and issuing warnings (check engine light, bulb failure, low tire pressure, etc.). The vehicle computer 145 may also be configured to provide various types of information to the in-vehicle entertainment system 125, such as, for example, information pertaining to certain operations of the vehicle 105 (vehicle speed, engine performance, equipment usage, etc.), actions performed by a driver 150 (accelerating, braking, stopping, etc.), and motion characteristics of the vehicle 105 (whether the vehicle 105 is in a stopped state, whether the vehicle 105 is in a moving state, stoppage time when in a stopped state, speed of the vehicle 105 when in a moving state, etc.).

The infotainment system 140 may include a combination of various entertainment items (such as a radio, streaming audio solutions, etc., and USB access ports for digital audio devices) and may also include other types of items, such as, for example, a navigation system that provides navigation instructions and displays route maps upon a display screen of the infotainment system 140. The navigation system can be configured to receive signals from a global positioning system (GPS) satellite. The display screen of the infotainment system 140 may also be configured to display various types of iconic representations provided by the in-vehicle entertainment system 125 such as, for example, a first iconic representation pertaining to a musical routine, a second iconic representation pertaining to a memory game, and a third iconic representation pertaining to a karaoke session.

The heads-up display 115 may include a combination of various items associated with supporting various types of driving operations (vehicle speed, navigation map, camera image display, etc.) and various items associated with the in-vehicle entertainment system 125 such as, for example, displaying lyrics of a song during a karaoke session executed by the in-vehicle entertainment system 125.

Some entertainment routines provided by the in-vehicle entertainment system 125 can involve the use of some vehicle components present in the cabin area of the vehicle 105. A few example vehicle components can include a steering wheel, a dashboard, a gear shifter, a console, and an armrest of a seat.

In one example implementation, various sensors are integrated into such vehicle components such as, for example, a sensor 163 and a sensor 164 mounted on a steering wheel of the vehicle 105, a sensor 166 mounted on a gear shifter of the vehicle 105, a sensor 167 mounted on a console of the vehicle 105, a sensor 162 mounted on an arm rest of a seat in the vehicle 105, and a sensor 161 mounted on a dashboard of the vehicle 105. The sensors can be any of various types of components that may convert applied pressure into electrical signals, such as, for example, a strain gauge that produces electrical signals in response to finger pressure and/or palm pressure upon the strain gauge.

More particularly, in the illustrated scenario, each sensor conveys an electrical signal to the in-vehicle entertainment system 125 in response to sensing a physical contact made upon a vehicle equipment in which the sensor is mounted. For example, the sensor 166 mounted on a gear shifter of the vehicle 105 conveys an electrical signal to the in-vehicle entertainment system 125 in response to sensing a physical contact made upon the gear shifter by the driver 150 of the vehicle 105.

A rhythmic tapping upon the gear shifter by the driver 150 can be conveyed to the in-vehicle entertainment system 125 in the form of a series of electrical pulses. The in-vehicle entertainment system 125 may couple the series of electrical pulses into a music synthesizer, which generates electrical signals having waveform characteristics resembling audio waveforms produced by a drum.

The electrical signals generated by the music synthesizer may be conveyed to the infotainment system 140 and broadcast out of a set of speakers of the infotainment system 140. Thus, the driver 150 can emulate a drummer in a band and execute a drum solo performance to keep himself/herself entertained while waiting for a traffic jam to be cleared, for example.

In this example implementation, the various sensors are generally located within arm's reach of the driver 150. In another example scenario, various sensors may be provided on various other vehicle components that are within arm's reach of one or more passengers (not shown) seated in any one of various seats in the vehicle 105. In such cases, the passenger(s) may participate along with the driver in various activities associated with the in-vehicle entertainment system 125. One example activity can include a passenger playing a first musical instrument (a guitar, for example) in an accompanying role when the driver 150 is playing a second musical instrument (a drum, for example).

The one or more cameras, which may be mounted at any of various locations on the vehicle 105, are communicatively coupled to the in-vehicle entertainment system 125 via wired and/or wireless transmission media. In the illustrated implementation, the camera 110 is mounted upon a vehicle member (pillar, frame, etc.) in the cabin area of the vehicle 105 and configured to capture images of the driver 150 performing various operations and may be further configured to capture images of other occupants of the vehicle 105.

The images may be conveyed to the in-vehicle entertainment system 125 in any of various forms such as, for example, in the form of digital images, video clips, and/or real-time video. The in-vehicle entertainment system 125 may evaluate the images to identify various actions performed by the driver 150. Such actions can relate to a musical routine, such as, for example, the drum solo performance described above.

In an example scenario, the in-vehicle entertainment system 125 generates musical sound signals based on evaluating the images provided by the camera 110. For example, action characteristics of a set of actions performed by the driver 150 (a drumming sequence, a guitar playing sequence, etc.) may be translated by the music synthesizer of the in-vehicle entertainment system 125 into corresponding sound signals (drum, guitar, etc.) and may be conveyed to a set of speakers of the infotainment system 140 for producing the sound of a drum or a guitar, for example.

In an example implementation, the in-vehicle entertainment system 125 may also send signals to the heads-up display 115 (and/or the infotainment system 140) for displaying video content that can be synchronized to the actions performed by the driver 150. The video content can be, for example, a video clip of the members of a band performing a musical routine. The driver 150 may operate as a drummer for the band and play the drums in cooperation with the members of the band.

Figure 2:
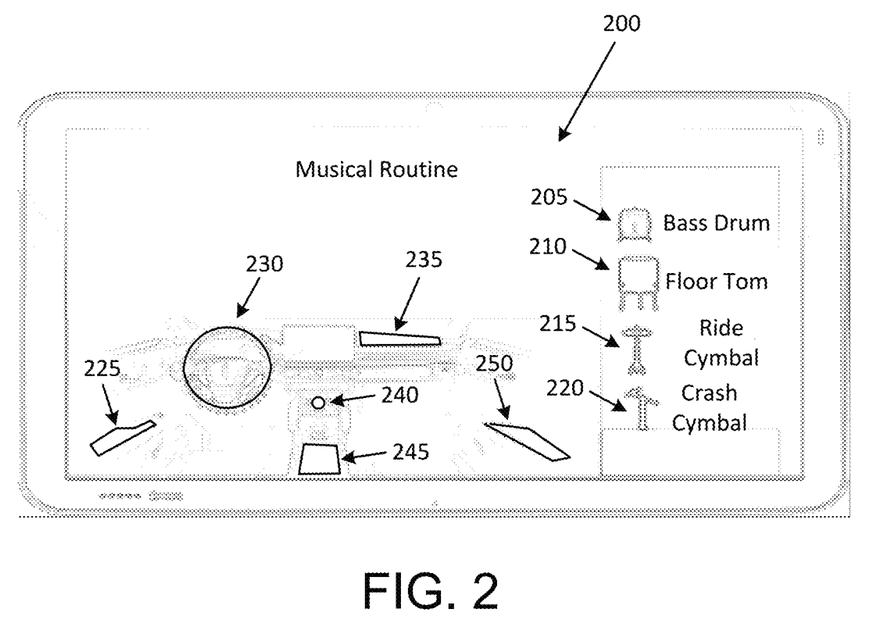
FIG. 2 shows a first example iconic representation generated by the in-vehicle entertainment system for a musical routine executed in accordance with an embodiment of the disclosure.

FIG. 2 shows a first example iconic representation 200 generated by the in-vehicle entertainment system 125 for a musical routine executed in accordance with an embodiment of the disclosure. The iconic representation 200 can be displayed on a display screen of a device such as, for example on a display screen of the infotainment system 140 or on a personal device of the driver 150 (a smartphone, a smart wearable device, etc.).

In this example, the iconic representation 200 includes a first set of icons representing various example vehicle components, and a second set of icons representing various example musical instruments. The various example vehicle components include a steering wheel 230, an arm rest 225 of the driver's seat, a gear shifter 240, a console 245, a dashboard 235, and an arm rest 250 of a front passenger seat. The various example musical instruments can include any type of percussion instrument, string instrument, wind instrument, keyboard instrument, or brass instrument, for example. In this case, the musical instruments shown include a bass drum 205, a floor tom 210, a ride cymbal 215, and a crash cymbal 220.

Figure 3:
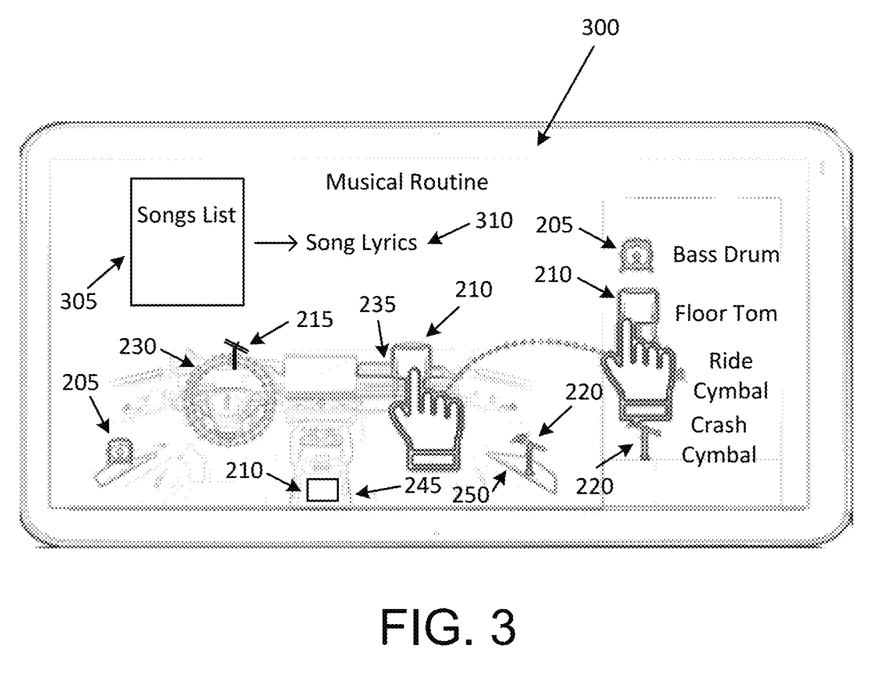
FIG. 3 shows a second example iconic representation generated by the in-vehicle entertainment system 125 for the musical routine referred to in FIG. 2.

FIG. 3 shows a second example iconic representation 300 generated by the in-vehicle entertainment system 125 for a musical routine executed in accordance with an embodiment of the disclosure. More particularly, the iconic representation 300 illustrates an example operational procedure that may be carried out upon the iconic representation 200 shown in FIG. 2. A first step of the operational procedure, which may be executed by an occupant of the vehicle 105 (such as, for example, the driver 150), is directed at assigning some or all of the musical instruments described above to some or all of the vehicle components described above.

The first step (assignment) can be executed in various ways such as, for example, by use of one or more menus, one or more tables, one or more drop-down boxes, one or more arrows, and/or by a drag-and-drop procedure. In an example implementation, the first step can be executed by a drag-and-drop operation to overlap one or more icons belonging to the second set of icons that represent the various musical instruments with one or more icons belonging to the first set of icons that represent the various vehicle components. Overlapping one icon over another provides to the processor 126 of the in-vehicle entertainment system 125, an indication of an assignment.

FIG. 3 illustrates a drag-and-drop operation to assign the floor tom 210 to the dashboard 235. The iconic representation 300 may also include graphical icons that provide an indication of which specific musical instrument is assigned to a specific vehicle component. Thus, for example, a graphical icon of the bass drum 205 is shown assigned to the arm rest 225 of the driver's seat, the ride cymbal 215 assigned to the steering wheel 230, and the crash cymbal 220 assigned to the arm rest 250 of the front passenger seat.

In an example scenario, the assignment may involve the driver 150 deciding to assign some musical instruments to certain vehicle components that are within reach of the driver 150, and some other musical instruments to vehicle components that may be out of reach to the driver 150 (or difficult to reach) but within reach of a passenger seated next to the driver 150 (or behind the driver 150). Some example vehicle components that may be within reach of the driver 150 are the armrest 225, the steering wheel 230, and the gear shifter 240. An example vehicle component that may be out of reach of the driver 150 (or difficult to reach) but within reach of a passenger seated next to the driver 150 is the armrest 250 of the front passenger seat.

A second step of the operational procedure, which may be executed by an occupant of the vehicle 105 (such as, for example, the driver 150), is directed at selecting a music source (song, tune, melody, etc.) that is appealing to the occupant for engaging in accompaniment with sounds produced by use of the vehicle components. In some cases, the second step may be carried out prior to the first step described above.

Selecting a music source can be carried out in various ways. In a first example approach, the occupant of the vehicle 105 may turn on the infotainment system 140 and select a radio station that broadcasts songs that appeal to the occupant. In a second example approach, the occupant of the vehicle 105 may carry out a karaoke selection on a device such as, for example, a smartphone.

In a second example approach, the occupant of the vehicle 105 may display a list of songs on a display screen of a device such as the infotainment system 140 or the heads-up display 115. In the illustration a songs list 305 is displayed upon the heads-up display 115. The driver 150 may make a song selection (in karaoke form, for example) and song lyrics 310 associated with the selected song may be displayed on the heads-up display 115.

The driver 150 can vocalize the song lyrics 310 while producing accompanying sounds by use of the vehicle components. The use of the heads-up display 115 for this purpose enables the driver 150 to keep an eye on the road ahead and operate the vehicle 105 in a safe manner.

Producing sounds by use of a vehicle components is carried out by the driver 150 (and/or the passenger) making physical contact with one or more vehicle components. The physical contact may be carried out in various ways such as, for example, by placing a finger or a palm upon the vehicle component. In the illustration shown in FIG. 3, the driver 150 can emulate a drummer in a band and execute a drum solo performance by rhythmically tapping his/her fingers upon the console 245 that has been assigned the floor tom 210.

The sensor 167 located in the console 245 responds to the rhythmic tapping by producing a series of electrical pulses that are conveyed to the in-vehicle entertainment system 125. The in-vehicle entertainment system 125 routes the series of pulses to a music synthesizer, which generates electrical signals having waveform characteristics resembling audio waveforms produced by a floor tom. The electrical signals generated by the music synthesizer may be conveyed to the infotainment system 140 and broadcast out of a set of speakers of the infotainment system 140. Thus, the driver 150 can emulate the drummer in the band and keep himself/herself entertained while waiting for a traffic jam to be cleared, for example.

In another example scenario, the steering wheel may be assigned a guitar, and the driver 150 can emulate a guitarist by strumming a portion of the steering wheel in a manner similar to strumming the strings of a guitar. The sensor 163 and/or the sensor 164 respond to the strumming by producing electrical signals that are conveyed to the in-vehicle entertainment system 125. The in-vehicle entertainment system 125 routes the electrical signals to a music synthesizer, which generates electrical signals having waveform characteristics resembling audio waveforms produced by a guitar. The electrical signals generated by the music synthesizer may be conveyed to the infotainment system 140 and broadcast out of a set of speakers of the infotainment system 140. Thus, the driver 150 can emulate a guitarist and keep himself/herself entertained while waiting for a traffic jam to be cleared, for example.

In another example implementation, the driver 150 can emulate a drummer by executing an air drumming sequence, or can emulate a person playing a stringed instrument (guitar, violin, etc.) by making gestures in the air. The camera 110 can capture real-time video of the gestures and convey the real-time video to the in-vehicle entertainment system 125. The in-vehicle entertainment system 125 can evaluate the images of the real-time video and configure the musical synthesizer to generate sounds corresponding to the gestures.

In another example implementation, the driver 150 can play an instrument while singing along in concert with the song lyrics 310 displayed on the heads-up display 115. In one case, the in-vehicle entertainment system 125 can offer a game in the form of a concert mode. In this game mode, the in-vehicle entertainment system 125 automatically selects in a sequential manner each of a number of songs from the songs list 305. The sequential selection may be based on presenting an increasing level of difficulty to the driver 150 for playing a musical instrument in concert with the song and/or for singing along in a karaoke fashion. A scoring system may be applied to the concert mode game. The scoring system may allow the driver 150 to compete with one or more occupants of the vehicle 105 in a concert mode session.

In another example implementation, the in-vehicle entertainment system 125 is configured to decrease driver distractions by curtailing certain operations that may be carried out by the driver 150. For example, the in-vehicle entertainment system 125 may be configured to allow the driver 150 to carry out a first set of actions upon the in-vehicle entertainment system 125 when the vehicle is in a stopped condition and a second set of actions when the vehicle 105 is moving. The second set of actions that are allowable by the in-vehicle entertainment system 125 may be fewer in number than the first set of actions.

Thus, for example, the in-vehicle entertainment system 125 may respond to an action performed by the driver 150 for setting up a musical routine (such as the one described above) by first communicating with the vehicle computer 145 to determine a movement status of the vehicle 105. In one scenario, the vehicle computer 145 may convey a signal to the in-vehicle entertainment system 125 that provides an indication that the vehicle 105 is in a stopped state. The in-vehicle entertainment system 125 may use this information to provide a display such as the iconic representation 200 illustrated in FIG. 2 that allows various operations to be carried out by the driver 150 such as the ones described above with reference to the iconic representation 300 illustrated in FIG. 3.

In another scenario, the vehicle computer 145 may convey a signal to the in-vehicle entertainment system 125 that provides an indication that the vehicle 105 is in a moving state. The in-vehicle entertainment system 125 may use this information to provide an iconic representation that offers fewer features than the iconic representation 200 illustrated in FIG. 2, in order to limit an amount of activity performed by the driver 150. The iconic representation in this case may display a fewer number of vehicle components and/or a fewer number of musical instruments than those included in the iconic representation 200. Displaying a fewer number of vehicle components may involve displaying a subset of the first set of icons described above. For example, icons corresponding to the gear shifter 240, the console 245, and the armrest 250 of a front passenger seat may be eliminated and an icon corresponding to the floor tom 210, for example, may be eliminated among the icons representing the musical instruments.

The in-vehicle entertainment system 125 may also use the moving state information received from the vehicle computer 145 to disable some operations performable upon the display screen of the infotainment system 140. For example, touch screen operations of the display screen of the infotainment system 140 may be disabled thereby preventing the driver 150 from carrying out the drag-and-drop operations described above for assigning musical instruments to vehicle components.

In another example implementation where the vehicle is an autonomous vehicle, the in-vehicle entertainment system 125 may provide an extensive set of features that are made available not only when the vehicle 105 is in a stopped state but also when the vehicle 105 is in motion. In some cases, the extensive set of features can exceed the number of features illustrated in the iconic representation 200.

Thus, a first set of features provided by the in-vehicle entertainment system 125 in a driver-operated vehicle when the driver-operated vehicle is in a moving state may be less than a second set of features associated with a driver-operated vehicle when the driver-operated vehicle is in a stopped state and/or may be less than a third set of features associated with an autonomous vehicle regardless of the stopped state or moving state of the autonomous vehicle.

In some cases, the in-vehicle entertainment system 125 may offer an alternative system, such as, for example, a voice recognition system for carrying out the assignment operation and other operations described above. An example voice command that may be provided by the driver 150 to the voice recognition system of the in-vehicle entertainment system 125 can be as follows: "Assign floor tom to the dashboard!" Other example voice commands can be provided in the following manner: "Select song number 3 from song list!" or "Play 'Raindrops keep falling on my head'!" The voice recognition system may interpret the commands by executing a voice recognition procedure and may generate information that may be used by the in-vehicle entertainment system 125 to execute operations such as, for example, assign the floor tom 210 to the dashboard 235 (as illustrated in FIG. 3).

Figure 4:
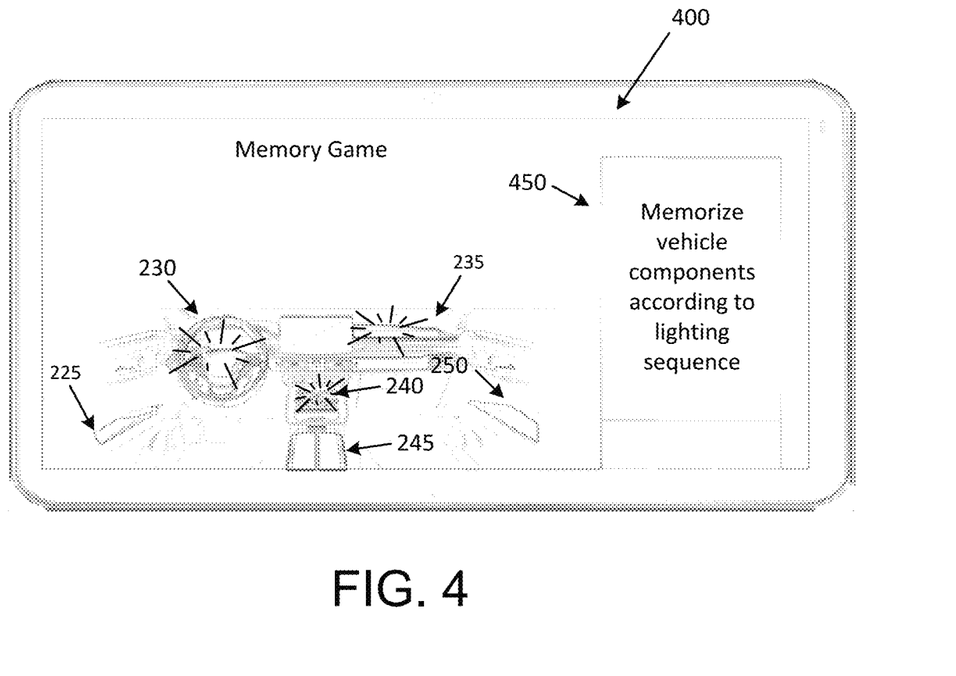
FIG. 4 shows a first example iconic representation generated by the in-vehicle entertainment system for a memory game executed in accordance with an embodiment of the disclosure.
Figure 5:
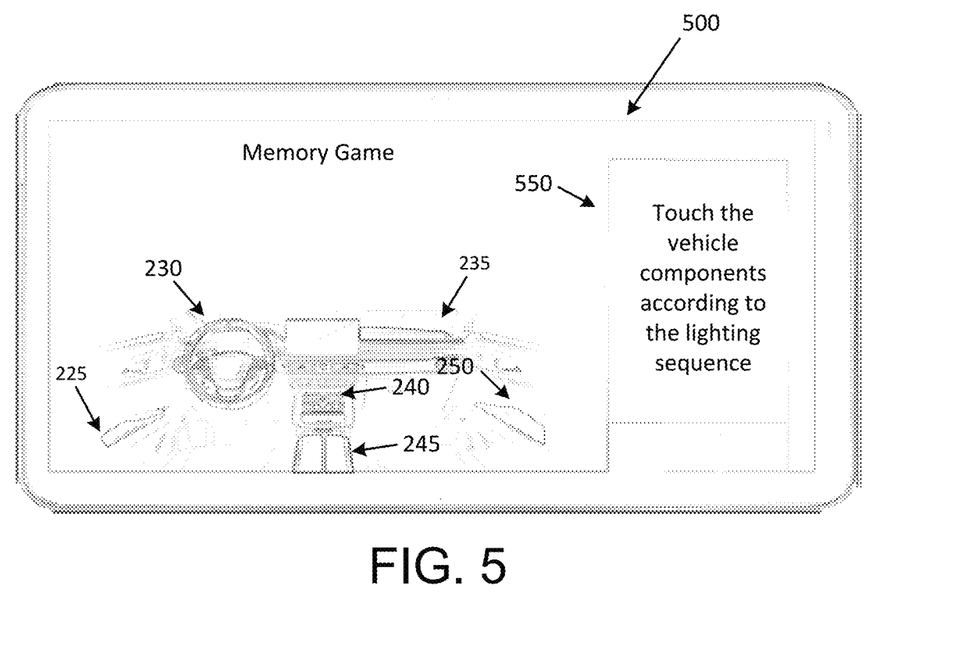
FIG. 5 shows a second example iconic representation generated by the in-vehicle entertainment system for the memory game referred to in FIG. 4.

FIG. 4 shows a first example iconic representation 400 generated by the in-vehicle entertainment system 125 for a memory game executed in accordance with an embodiment of the disclosure. FIG. 5 shows a second example iconic representation 500 generated by the in-vehicle entertainment system 125 for the memory game associated with the iconic representation 400 shown in FIG. 4. The iconic representation 400 and the iconic representation 500 may be displayed on a display screen of a device such as, for example, the infotainment system 140.

More particularly, the iconic representation 400 shows a portion 450 that provides instructions for playing the memory game. An example instruction can be as follows: "Memorize vehicle components according to the lighting sequence!" The iconic representation 400 further illustrates a first part of the memory game in which the in-vehicle entertainment system 125 displays a set of sequential patterns by utilizing various icons corresponding to the vehicle components.

A first sequential pattern of the set of sequential patterns is displayed by sequentially highlighting each of a first number of icons in the set of icons. Thus, for example, the in-vehicle entertainment system 125 may use three icons corresponding to the dashboard 235, the steering wheel 230, and the gear shifter 240 for providing a first sequential pattern. The first sequential pattern may be started by applying a flashing pattern upon the icon corresponding to the dashboard 235. After a first period of time, the flashing pattern applied to the icon corresponding to the dashboard 235 is terminated and a flashing pattern is applied to the icon representing the steering wheel 230. After a second period of time, the flashing pattern applied to the icon corresponding to the steering wheel 230 is terminated and a flashing pattern is applied to the icon representing the gear shifter 240.

After completion of application of the flashing patterns upon the three icons, the in-vehicle entertainment system 125 displays the iconic representation 500, which includes a portion 550 that provides additional instructions for playing the memory game. An example instruction can be as follows: "Touch the vehicle components according to the lighting sequence!" The driver 150 may respond to the instruction by executing a touching sequence by touching the dashboard 235, the steering wheel 230, and the gear shifter 240.

The in-vehicle entertainment system 125 evaluates signals received from the camera 110 and/or sensors in the dashboard 235, the steering wheel 230, and the gear shifter 240 and compares the touching sequence to the first sequential pattern shown in FIG. 4. The in-vehicle entertainment system 125 may display a result of the comparison upon the display screen of the infotainment system 140, for example. In this case, the comparison indicates that the driver 150 executed the touch sequence accurately. In another case, the driver 150 may fail to match the sequential pattern and the result of the comparison may be displayed in the form of a failure message. An example failure message can be provided as follows: "Oops! Please try again! You will be an expert very soon!"

If the result of the comparison indicates that the driver 150 executed the touch sequence accurately, the in-vehicle entertainment system 125 may execute a second sequential pattern. In a first example scenario, the second sequential pattern can be applied to the same number of vehicle component icons as before but in a different pattern such as, for example, by applying the flashing sequence to the steering wheel 230, followed by the gear shifter 240, and then the dashboard 235.

If the driver 150 is successful in replicating the second sequential pattern with a second touching sequence, the in-vehicle entertainment system 125 may repeat the procedure by executing a third sequential pattern and so on until the driver 150 either fails or terminates the memory game. In an example implementation, a scoring system may be applied to the memory game and the driver 150 may terminate the memory game upon attaining a desired score. The scoring system may also allow the driver 150 to compete with one or more occupants of the vehicle 105 in a group-play session. The game may be terminated at any time depending upon an interest level and/or an enthusiasm level of one or more of the game participants.

In an alternative scenario, the second sequential pattern may be applied to a different number of vehicle component icons. For example, the second sequential pattern may be increased to four icons rather than the three icons used for the first sequential pattern. The in-vehicle entertainment system 125 may execute the second sequential pattern at the same sequencing rate as used for the first sequencing pattern or can be different (slower or faster). If the driver 150 is successful in replicating the second sequential pattern involving four icons in this example, the in-vehicle entertainment system 125 may repeat the procedure by executing a third sequential pattern involving more than four icons. Additional sequential patterns involving more than four icons may be executed until the driver 150 either fails or terminates the game.

Figure 6:
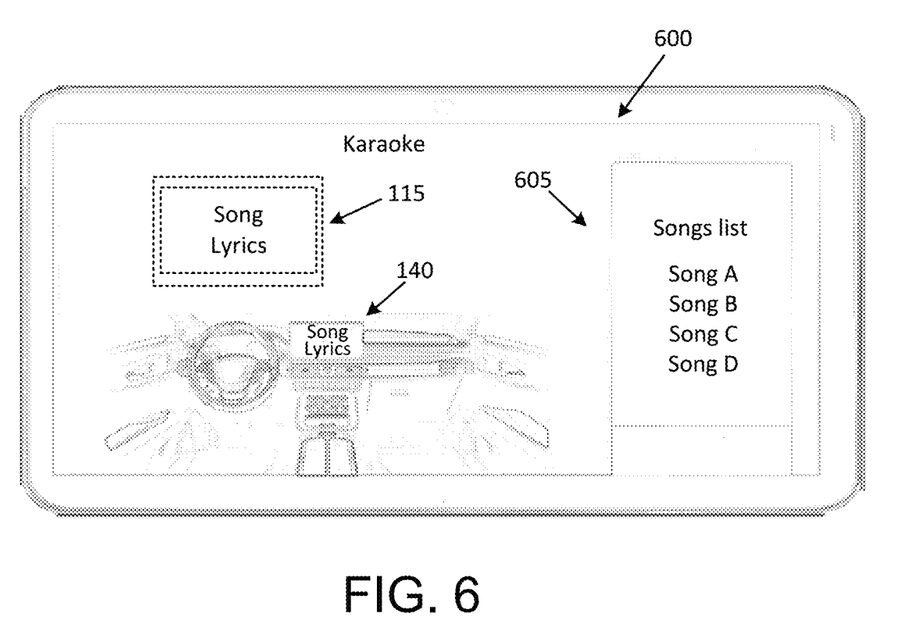
FIG. 6 shows an example iconic representation associated with executing a karaoke session by use of an in-vehicle entertainment system in accordance with an embodiment of the disclosure.

FIG. 6 shows an example iconic representation 600 associated with executing a karaoke session by use of the in-vehicle entertainment system 125 in accordance with an embodiment of the disclosure. The iconic representation 600 may be displayed on a display screen of a device such as, for example, the infotainment system 140. An occupant of the vehicle 105, such as, for example, the driver 150, can select a song from a menu screen 605. Song selection may be carried out in various ways such as, for example, by touch (when the iconic representation 600 is displayed on a touch screen), by use of a joystick, or by use of a keypad. Song lyrics corresponding to the selected song may then be displayed in a karaoke format upon the display screen of the infotainment system 140 and/or of the heads-up display 115. The driver 150 can participate in a karaoke session by singing the displayed lyrics.

In an example implementation in accordance with the disclosure, the driver 150 may launch the karaoke session after setting up a musical routine in the manner described above where various vehicle components are assigned various musical instruments. The driver 150 may then proceed with singing the displayed lyrics in karaoke fashion accompanied by playing of a musical instrument (drum, guitar, etc.) upon the vehicle components. Thus, an occupant of the vehicle can combine a musical routine with a karaoke routine to keep himself/herself entertained while waiting for a traffic jam to clear up, for example.

Figure 7:
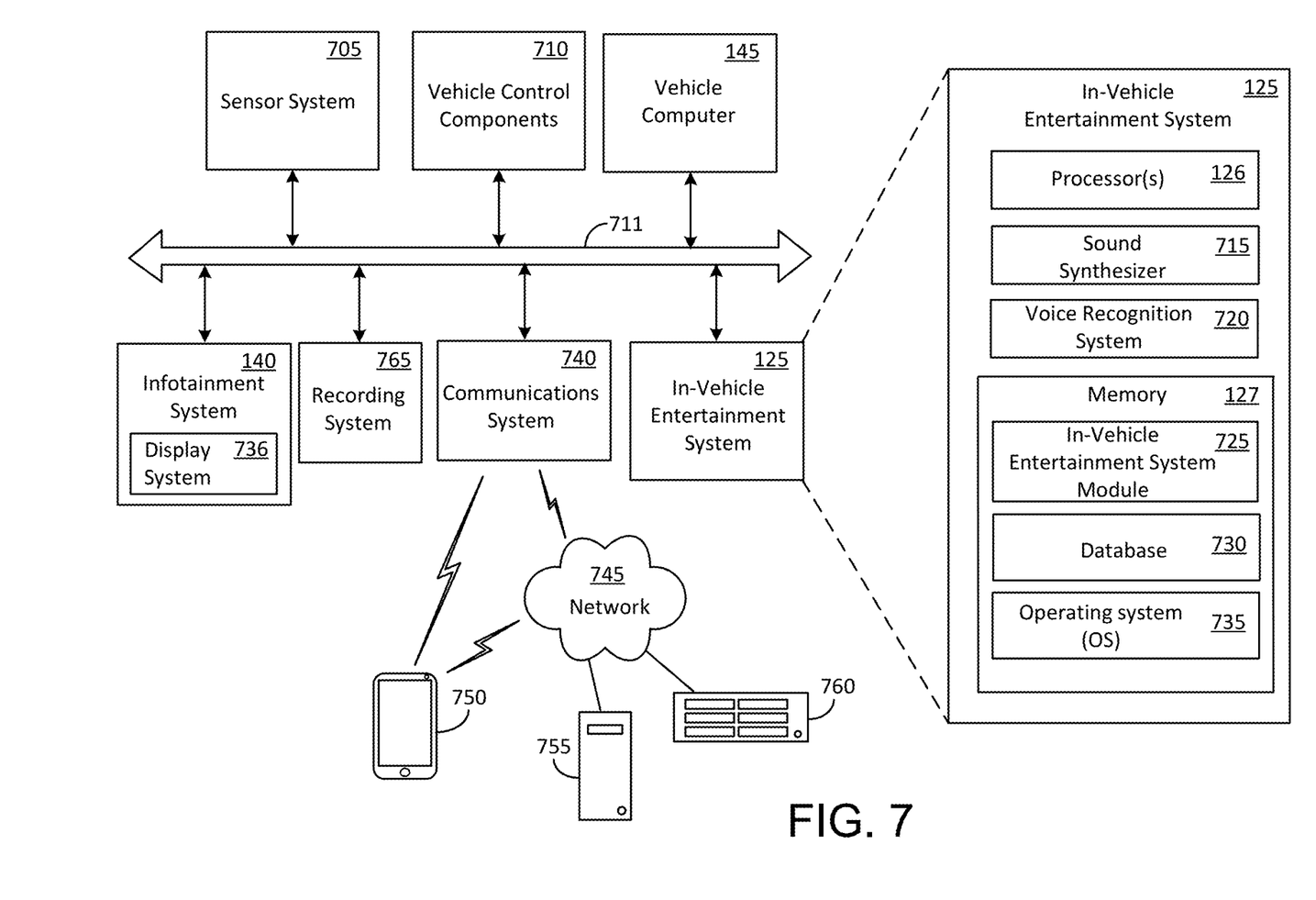
FIG. 7 shows some example components that can be included in a vehicle having an in-vehicle entertainment system in accordance with an embodiment of the disclosure.

FIG. 7 shows some example components that can be included in the vehicle 105 in accordance with an embodiment of the disclosure. The example components can include a sensor system 705, vehicle control components 710, the vehicle computer 145, the infotainment system 140, a recording system 765, a communications system 740, and the in-vehicle entertainment system 125. The various components are communicatively coupled to each other via one or more buses such as an example bus 711. The bus 711 may be implemented using various wired and/or wireless technologies. For example, the bus 711 can be a vehicle bus that uses a controller area network (CAN) bus protocol, a Media Oriented Systems Transport (MOST) bus protocol, and/or a CAN flexible data (CAN-FD) bus protocol. Some or all portions of the bus 711 may also be implemented using wireless technologies such as Bluetooth®, Ultra-Wideband, Wi-Fi, Zigbee®, or near-field-communications (NFC).

The infotainment system 140 can include a display system 736 having a GUI for carrying out various operations. The GUI may be used, for example, by the driver 150 to provide information that may be pertinent to the in-vehicle entertainment system 125, such as, for example, a selection from a song list. The in-vehicle entertainment system 125 may communicate with the infotainment system 140 for displaying various iconic representations upon the display system 736 such as the example iconic representations described above.

The sensor system 705 can include various types of sensors such as, for example, the sensor 163 and sensor 164 mounted on the steering wheel 230, the sensor 166 mounted on the gear shifter of the vehicle 105, the sensor 167 mounted on the console of the vehicle 105, the sensor 162 mounted on the arm rest of the driver's seat in the vehicle 105, and the sensor 161 mounted on the dashboard of the vehicle 105.

The vehicle control components 710 can include various components and systems associated with driving functions of the vehicle 105 (such as, for example, the engine, brakes, accelerator, and fuel injection) and various other functions of the vehicle 105 (such as, for example, stocks and struts whose characteristics can be controlled for varying a performance of the vehicle 105). The various components may be controlled, activated, and/or operated by the vehicle computer 145 and in some cases, by the in-vehicle entertainment system 125.

The communications system 740 can include various components such as, for example, a wireless transmitter, a wireless receiver, and/or a wireless transceiver, that are configured to allow the in-vehicle entertainment system 125 to communicate with devices such as, for example, a mobile device 750, a cloud computer 755, and a cloud storage device 760. The communications may be carried out via wireless signals either directly, or via a network 745, using any of various communication formats such as, for example, cellular, TCP/IP, Bluetooth®, Ultra-Wideband, Wi-Fi, Ultra-Wideband (UBW), Zigbee®, and near-field-communications (NFC).

The network 745 may include any one, or a combination of networks, such as a local area network (LAN), a wide area network (WAN), a telephone network, a cellular network, a cable network, a wireless network, and/or private/public networks such as the Internet. At least one portion of the network 745 includes a wireless communication link (a WiFi link, for example), that allows the in-vehicle entertainment system 125, the vehicle computer 145, and/or the infotainment system 140 to communicate with the cloud computer 755 and/or the cloud storage device 760.

In some scenarios, the cloud computer 755 may cooperate with the in-vehicle entertainment system 125 for executing various operations in accordance with the disclosure. The cloud storage device 760 can include various types of data and information that may be accessed by the in-vehicle entertainment system 125 for executing various operations in accordance with the disclosure. For example, the cloud storage device 760 may include songs that may be displayed in a songs list on a display screen of the infotainment system 140 of the vehicle 105 and/or transmitted through the infotainment system 140.

The recording system 765 can include one or more of various types of audio and/or video recording devices (audio recorder, digital camera, video camera, etc.). The devices are configured to record audio and/or video portions of various operations executed by the driver 150 and/or other occupants of the vehicle 105 in connection with the various activities described above (musical routine, memory game, karaoke session, etc.). In an example scenario, a video camera of the recording system 765 may be automatically activated when the driver 150 initiates an activity (a karaoke session, for example). In another example scenario, in place of automatic activation, the video camera may be manually activated by the driver 150 if he/she desires to record an activity. In either scenario, the video camera records the voice of the driver 150 and various actions performed by the driver 150 in the form of a video clip. The driver 150 may opt to share the video clip with others (via a social media platform such as Meta®, for example) and can do so by providing a command via the GUI on the infotainment system 140 to the in-vehicle entertainment system 125. The processor 126 of the in-vehicle entertainment system 125 may respond to the command by executing a transmission procedure for transmitting the video clip to one or more devices via the network 745. A digital camera of the recording system 765 can be used in a similar manner for sharing images.

In one implementation, the in-vehicle entertainment system 125 can be an independent device (enclosed in an enclosure, for example). In another implementation, some or all components of the in-vehicle entertainment system 125 can be housed, merged, or can share functionality, with the vehicle computer 145. For example, an integrated unit that combines the functionality of the in-vehicle entertainment system 125 with that of the vehicle computer 145 can be operated by a single processor and a single memory device. In the illustrated example configuration, the in-vehicle entertainment system 125 includes the processor 126, a sound synthesizer 715, a voice recognition system 720, and a memory 127.

The sound synthesizer 715 is configured to generate various types of sounds, particularly sounds generated by various instruments that are used for various musical routines in accordance with disclosure. The sounds are generated under control of the in-vehicle entertainment system module 725 that provides commands to the sound synthesizer 715 based on evaluating signals received from various sensors, and/or based on evaluating images received from the camera 110.

The voice recognition system 720 is configured to cooperate with the in-vehicle entertainment system module 725 for executing various operations in accordance with the disclosure. In an example operation, the voice recognition system 720 may recognize and interpret voice input provided by an occupant of the vehicle 105 (the driver 150, for example) and generate a signal that the in-vehicle entertainment system module 725 can interpret for executing an operation such as, for example, assigning a musical instrument to a vehicle component, or selectin a song from a songs list.

The memory 127, which is one example of a non-transitory computer-readable medium, may be used to store an operating system (OS) 735, a database 730, and various code modules such as an in-vehicle entertainment system module 725. The code modules are provided in the form of computer-executable instructions that can be executed by the processor 126 for performing various operations in accordance with the disclosure.

The database 730 may be used to store information, content, and/or data that may be used by the in-vehicle entertainment system module 725 for executing various operations in accordance with the disclosure. A few example items may include songs, icons, vehicle component data of various types of vehicles, and information associated with entertainment items (musical routines, memory games, etc.). Such items may be accessed by the processor 126 for various purposes, such as, for example, displaying a demonstration video or an instructional video (how to play a guitar, how to play a drum, how to execute a musical routine, how to play a memory game, etc.). The songs stored in the database 730 may, for example, include a custom list of songs preferred by the driver 150. In one example implementation, songs may be fetched from an online source (via the network 745) and stored (either short-term or long-term) in the database 730. In another implementation, the processor 126 may operate the in-vehicle entertainment system module 725 to live-stream songs obtained from a source such as, Spotify® for example. With reference to a karaoke session, the lyrics of a song may be either stored in the database 730 or obtained from an online source.

The in-vehicle entertainment system module 725 may be executed by the processor 126 for performing various operations in accordance with the disclosure including, for example, the various operations described above (music routine, memory game, karaoke session, etc.).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    displaying, by a processor in a vehicle, an iconic representation comprising a set of icons, the set of icons comprising a first icon representing a first vehicle component; and
    executing, by the processor, an entertainment procedure based on the iconic representation, the entertainment procedure comprising a use of the first icon in a musical routine and/or a memory game,
    wherein the musical routine comprises:
        including, by the processor, in the iconic representation, a second icon representing a musical instrument;
        detecting, by the processor, an assigning of the musical instrument to the first vehicle component via the first icon;
        detecting, by the processor, a physical contact made upon the first vehicle component; and
        generating, by the processor, based on detecting the physical contact, a musical sound corresponding to the musical instrument.

2. The method of claim 1, wherein the iconic representation is displayed on a display screen of an infotainment system in the vehicle, and wherein assigning the musical instrument to the first vehicle component via the first icon comprises:
    executing a drag-and-drop operation to overlap the second icon representing the musical instrument with the first icon representing the first vehicle component.

3. The method of claim 1, wherein the first vehicle component is located in a cabin area of the vehicle and the physical contact comprises an occupant of the vehicle placing one of a finger or a palm upon the first vehicle component.

4. The method of claim 3, wherein the first vehicle component is one of a steering wheel, a dashboard, a gear shifter, a console, or an arm rest of a seat, and wherein the musical instrument comprises one of a percussion instrument a string instrument, a wind instrument, a keyboard instrument, or a brass instrument.

5. The method of claim 1, wherein generating the musical sound based on detecting the physical contact comprises:
    evaluating, by the processor, a signal received from a sensor located in the first vehicle component.

6. The method of claim 1, wherein generating the musical sound based on detecting the physical contact comprises:
    capturing an image of a cabin area of the vehicle; and
    evaluating the image to identify the physical contact made upon the first vehicle component by an occupant of the vehicle.

7. The method of claim 6, wherein evaluating the image to identify the physical contact comprises detecting a placement of one of a finger or a palm of the occupant upon the first vehicle component.

8. The method of claim 1, wherein the memory game comprises:
    highlighting, in correspondence to a first sequential pattern, a first number of icons in the set of icons;
    detecting, by the processor, a first touching sequence executed upon a first number of vehicle components in the vehicle;
    comparing, by the processor, the first touching sequence to the first sequential pattern; and
    displaying, by the processor, a first result of comparing the first touching sequence to the first sequential pattern.

9. The method of claim 8, wherein the first vehicle component is one of a steering wheel, a dashboard, a gear shifter, a console, and/or an arm rest of a seat, and wherein the method further comprises:
    highlighting, in correspondence to a second sequential pattern, a second number of icons in the set of icons, wherein the second number of icons is greater than the first number of icons;
    detecting, by the processor, a second touching sequence executed upon a second number of vehicle components in the vehicle;
    comparing, by the processor, the second touching sequence to the second sequential pattern; and displaying, by the processor, a second result of comparing the second touching sequence to the second sequential pattern.

10. The method of claim 8, wherein detecting the first touching sequence comprises:
capturing an image of a cabin area of the vehicle; and
evaluating the image to identify the first touching sequence executed by an occupant of the vehicle.

11. The method of claim 8, wherein detecting the first touching sequence comprises:
evaluating, by the processor, a first signal received from a first sensor located in the first vehicle component; and
evaluating, by the processor, a second signal received from a second sensor located in a second vehicle component of the vehicle.

12. A method comprising:
displaying, by a processor, an iconic representation comprising a first icon representing a musical instrument and a second icon representing a vehicle component;
detecting, by the processor, an assigning of the musical instrument to the vehicle component;
detecting, by the processor, a physical contact made upon the vehicle component; and
generating, by the processor, based on detecting the physical contact, a musical sound corresponding to the musical instrument.

13. The method of claim 12, wherein the iconic representation is displayed on a display screen of an infotainment system in a vehicle, and wherein assigning the musical instrument to the vehicle component comprises executing a drag-and-drop operation to overlap the first icon with the second icon.

14. The method of claim 12, wherein the vehicle component is located in a cabin area of a vehicle and the physical contact comprises an occupant of the vehicle placing one of a finger or a palm upon the vehicle component.

15. The method of claim 14, wherein the vehicle component is one of a steering wheel, a dashboard, a gear shifter, a console, or an arm rest of a seat, and wherein the musical instrument comprises one of a percussion instrument a string instrument, a wind instrument, a keyboard instrument, or a brass instrument.

16. A vehicle comprising:
an infotainment system comprising a display screen; and
an in-vehicle entertainment system comprising:
a memory containing computer-executable instructions; and
a processor configured to access the memory and execute the computer-executable instructions to perform operations comprising:
displaying an iconic representation comprising a set of icons, the set of icons including a first icon representing a first vehicle component; and
executing an entertainment procedure based on the iconic representation, the entertainment procedure comprising a use of the first icon in a musical routine and/or a memory game,
wherein the memory game comprises:
highlighting, in correspondence to a first sequential pattern, a first number of icons in the set of icons;
detecting, by the processor, a first touching sequence executed upon a first number of vehicle components in the vehicle;
comparing, by the processor, the first touching sequence to the first sequential pattern; and
displaying, by the processor, a first result of comparing the first touching sequence to the first sequential pattern.

17. The vehicle of claim 16, wherein the processor is further configured to access the memory and execute the computer-executable instructions to perform additional operations comprising:
including, in the iconic representation, a second icon representing a musical instrument;
detecting, an assigning of the musical instrument to the first vehicle component;
detecting, a physical contact made upon the first vehicle component; and
generating, based on detecting the physical contact, a musical sound corresponding to the musical instrument.

18. The vehicle of claim 17, wherein the first vehicle component is one of a steering wheel, a dashboard, a gear shifter, a console, or an arm rest of a seat, and wherein the musical instrument comprises one of a percussion instrument a string instrument, a wind instrument, a keyboard instrument, or a brass instrument.

19. A method comprising:
displaying, by a processor in a vehicle, an iconic representation comprising a set of icons, the set of icons comprising a first icon representing a first vehicle component; and
executing, by the processor, an entertainment procedure based on the iconic representation, the entertainment procedure comprising a use of the first icon in a musical routine and/or a memory game,
wherein the memory game comprises:
highlighting, in correspondence to a first sequential pattern, a first number of icons in the set of icons;
detecting, by the processor, a first touching sequence executed upon a first number of vehicle components in the vehicle;
comparing, by the processor, the first touching sequence to the first sequential pattern; and
displaying, by the processor, a first result of comparing the first touching sequence to the first sequential pattern.

* * * * *